United States Patent
Fürstenberg

(10) Patent No.: US 7,746,271 B2
(45) Date of Patent: Jun. 29, 2010

(54) METHOD FOR DETERMINING THE GLOBAL POSITION

(75) Inventor: Kay Fürstenberg, Hamburg (DE)

(73) Assignee: IBEO Automobile Sensor GmbH, Hamburg (DE)

( * ) Notice: Subject to any disclaimer, the term of this patent is extended or adjusted under 35 U.S.C. 154(b) by 260 days.

(21) Appl. No.: 11/894,262

(22) Filed: Aug. 17, 2007

(65) Prior Publication Data
US 2008/0052000 A1 Feb. 28, 2008

(30) Foreign Application Priority Data
Aug. 28, 2006 (EP) .................... 06017876

(51) Int. Cl.
*G01S 19/41* (2010.01)
(52) U.S. Cl. .............................. 342/357.03
(58) Field of Classification Search .............. None
See application file for complete search history.

(56) References Cited

U.S. PATENT DOCUMENTS

| | | | |
|---|---|---|---|
| 5,751,244 A * | 5/1998 | Huston et al. | 342/357.03 |
| 5,786,790 A * | 7/1998 | Abbott | 342/357.02 |
| 6,100,842 A * | 8/2000 | Dreier et al. | 342/357.08 |
| 6,246,363 B1 * | 6/2001 | Yung et al. | 342/357.14 |
| 6,640,106 B2 * | 10/2003 | Gutowski et al. | 455/456.1 |

FOREIGN PATENT DOCUMENTS

| | | |
|---|---|---|
| EP | 0427431 A2 | 5/1991 |
| JP | 2005207821 | 8/2005 |
| WO | WO2004/027434 | 4/2004 |

OTHER PUBLICATIONS

Article: Fürstenberg, K. et al.: "Pedistrain Recognition and Tracking of Vehicles using a Vehicle based Multilayer Laserscanner", Proceedings of ITS 2003, 10$^{th}$ World Congress on Intelligent Transport Systems, Nov. 2003, Madrid, Spain; 12 pages.
Article: Kirchner, A., "Sensor data processing of a laser scanner for autonomous driving functions of motor vehicles" Düsseldorf: VDI Verlag, 2000, ISBN 3-18-343812-7, ISSN 0178-9449; 1 page.
European Search Report dated Dec. 4, 2006 relating to European Patent Application No. 06 017 876.1; 3 pages.
Translation of European Search Report dated Dec. 4, 2006 relating to European Patent Application No. 06 017 876.1; 4 pages.

* cited by examiner

*Primary Examiner*—Gregory C Issing

(57) ABSTRACT

The invention relates to a method of increasing accuracy of a global position of a user receiver determined by a navigation system. The global position is corrected based on a position error determined by a mobile reference receiver and transmitted to the user receiver. The invention further relates to a corresponding apparatus.

15 Claims, 3 Drawing Sheets

METHOD FOR DETERMINING THE GLOBAL POSITION

FIELD

The present invention relates to a method of increasing accuracy of a global position of a user receiver determined by a navigation system, such as by a satellite assisted navigation system. The invention further relates to a corresponding apparatus.

BACKGROUND

A global position of a mobile user receiver, for example, of a vehicle equipped with a GPS (global positioning system) receiver and determined by a navigation system that is satellite assisted is as a rule subject to accuracy errors. The accuracy errors are caused by atmospheric effects, which result as the consequence of varying propagation speeds of signals transmitted by the navigation system. A global position determined solely by a navigation system is as a rule consequently subject to error.

To reduce the accuracy errors, stationary reference receivers (called base stations) and whose global positions are known are used. A position error of the global position determined by the navigation system can be calculated in the form of correction data and based on the known global position of a reference receiver and the global position of the reference receiver determined by the navigation system. The position error calculated by a stationary reference receiver can then be transmitted to mobile user receivers and used for the correction of global positions of mobile user receivers determined by navigation systems. In the known satellite assisted navigation system, this process is called DGPS (differential GPS).

Stationary reference receivers of this type are, however, not available with blanket coverage. A correction of a global position of a user receiver determined by navigation system is not possible everywhere. Furthermore, the achievable accuracy of a navigation system is dependent on the distance of a mobile user receiver from a stationary reference receiver and thus on the density of reference receivers, i.e. the number of reference receivers per unit of area.

SUMMARY

It is therefore the underlying object of the present invention to provide a method that eliminates the aforesaid disadvantages, and to provide an apparatus that can perform the method.

The object is satisfied by a method having the features of claim 1. The method includes determining a global position of a mobile receiver by a navigation system. At least one stationary landmark is detected by a mobile reference receiver provided with at least one environment (i.e., an object detection) sensor. A global position of the landmark is known in at least one spatial direction and is included in a digital map. A position error of the global position of the reference receiver is determined by the navigation system for at least one spatial direction. The position error is determined based on the known global position of the detected stationary landmark based on: its relative position; the position error of the global position with respect to the mobile reference receiver; and the global position of the mobile reference receiver determined by the navigation system. The calculated position error is transmitted from the mobile reference receiver to the user receiver to increase the accuracy of the global position of the user receiver determined by a navigation system.

The invention is in particular characterized in that, instead of or in addition to using stationary reference receivers, mobile references receivers are used, such as vehicles equipped with a receiver for receiving signals from a navigation system. For example, a GPS receiver and a transmitter for transmitting a position error in the form of correction data is provided. Corrected global positions of the mobile reference receiver can be determined with reference to stationary landmarks such as posts, traffic lights, crash barriers or lane markings. Global positions of the landmarks are in turn known from a digital map.

In contrast to stationary reference receivers, the global position of a mobile reference receiver is naturally not constant and/or is not known in advance, but rather is determined via an environment sensor system. The global position of the mobile reference receiver is determined based on known global positions of landmark(s). For example, the relative position of the detected stationary landmark with respect to the mobile reference receiver can be determined by the environment sensor system. The environment sensor system may include one or more environment (object) sensors, such as distance sensors, radar sensors, ultrasound sensors, video sensors, infrared sensors, and/or laser scanners or any desired combination of different sensor types.

In many cases, landmarks, such as lane markings or crash barriers, extend in one direction. The global position of the landmarks is only known and/or detectable in one spatial direction, such as transversely to the direction of travel. A position error can also only be calculated for this spatial direction. The position error is only calculated in these cases for at least one spatial direction, such as transversely to the direction of movement of the mobile reference receiver.

The method in accordance with the invention allows vehicles which are equipped with a receiver, for the evaluation of signals of a navigation system, and with an environment sensor system to transmit the position error otherwise calculated for the use of their own vehicle to other vehicles. The environment sensor systems may be used by vehicle assistance systems, such as ACC (adaptive cruise control), crash avoidance, navigation assistance and automatic emergency braking. The position error may be transmitted to vehicles that do not have an environment sensor system. The position error can be transmitted, for example, to other vehicles via vehicle-to-vehicle communication in the radio frequency range.

A reference receiver density of stationary reference receivers can be increased using the invention. As an alternative, independent reference receiver networks can be operated with a sufficient number of mobile reference receivers with an environment sensor system and a digital map.

The navigation system can be a satellite-assisted navigation system, such as a GPS. The navigation system can also be a terrestrially based navigation system that, for example, uses radio or TV masts as transmitter stations.

The calculation of a global position error may be determined using a DGPS and is not looked at in any more detail within the framework of the present invention.

Advantageous embodiments of the invention are also recited in the dependent claims, in the description and in the drawings.

In accordance with a preferred embodiment of the invention, a known global position in a digital map of a detected stationary landmark is determined in dependence on a global position of a mobile reference receiver by the navigation system. A section of an environment of the global position of the mobile reference receiver is determined. Data with respect to the detected stationary landmark is compared with data from the section of the digital map. The association of the detected stationary landmark with the entry in the digital map corresponding to the detected stationary landmark, and thereby the determination of the known global position of the detected stationary landmark, can hereby be accelerated. The data can in particular be data which represents the size, shape and/or reflectivity or any other characterizing property of the corresponding stationary landmark.

In accordance with a further preferred embodiment of the invention, stationary landmarks are detected, recognized and/or tracked in multiple sequential cycles. The landmarks are detected, recognized and/or tracked continuously by an environment sensor, such as a laser scanner, during the movement of the mobile reference receiver (e.g., vehicle). Additional data on the environment of the mobile receiver, such as on individual stationary landmarks, can be obtained when multiple stationary landmarks are detected. This facilitates and secures the association of the detected stationary landmarks with corresponding entries in the digital map. The additional data also facilitates and secures the determination of the known global position of the detected stationary landmark. Methods for the recognition and/or tracking of objects based on range images are generally known. An example for such a method is described in "Fortschritt-Berichte VDI, Reihe 12, Nr. 438, Kirchner, A., "Sensordatenverarbeitung eines Laserscanners fur autonome Fahrfunktionen von Kraftfahrzeugen", (Progress Reports VDI, Series 12, No. 438, Kirchner, A., "Sensor data processing of a laser scanner for autonomous driving functions of motor vehicles] VDI Verlag GmbH, Dusseldorf 2000, ISBN 3-18-343812-7, ISSN 0178-9449. A description of such a method can furthermore be found in the publication of Furstenberg, K. et al.; "Pedestrian Recognition and Tracking of Vehicles using a Vehicle based Multilayer Laserscanner", Proceedings of ITS 2003, $10^{th}$ World Congress on Intelligent Transport Systems, November 2003, Madrid, Spain.

The known global position of the detected stationary landmark can be compared with the global position of the stationary landmark as determined by the navigation system. The global position of the stationary landmark can be determined based on the global position of the mobile reference receiver. The global position of the stationary landmark relative to the mobile reference receiver as determined by the navigation system can be subject to error. A known global position of the stationary landmark and a determined global position of the stationary landmark (which is subject to error) are compared with one another in this process. However, the global position of the mobile reference receiver as determined by the navigation system and the corrected global position of the mobile reference receiver are preferably compared with one another to calculate the position error. The corrected global position can be determined from the known global position of the detected stationary landmark and relative position of the stationary landmark with reference to the mobile reference receiver. In this process a global position of the mobile reference receiver and a corrected global position of the mobile reference receiver are compared with one another. The corrected global position of the mobile reference receiver can be used for navigation assistance by the mobile reference receiver.

Generally, with multiple detected stationary landmarks, a corrected global position of a mobile reference receiver can be determined and position errors can be calculated for each of the detected stationary landmarks. An averaged position error can be calculated based on the calculated position errors. With multiple detected stationary landmarks, however, only a corrected global position of the mobile reference receiver is preferably determined to reduce the calculation time. The corrected global position is compared with the global position of the mobile reference received determined by the navigation system to calculate the position error.

The object is furthermore satisfied by a method having the features of claim 6 and including receiving at least one position error calculated for at least one spatial direction from at least one mobile reference receiver. A corrected global position of a user receiver for at least one spatial direction is determined with reference to the received position error.

User receivers that do not have an environment sensor system can hereby obtain position errors calculated by mobile reference receivers equipped with environment sensor systems. This allows the user receivers to correct their own global position determined by a navigation system and subject to error. A mobile reference receiver can also be a user receiver.

A corrected global position of a user receiver can be determined with reference to at least two position errors calculated in each case for at least one spatial direction and received from at least two different mobile reference receivers. The directions of movement and/or the spatial directions of the mobile reference receivers extend substantially perpendicular to one another, for example, with a bridge crossing. A position error that was received from a first reference receiver can be supplemented by a position error which was calculated and received by a second reference receiver. The position error of the first reference receiver is calculated in only at least one spatial direction and therefore results in a global position only corrected in at least one spatial direction. The position error of the second reference receiver is calculated in at least one further spatial direction to permit a correction of the global position of the user receiver in multiple spatial directions. The user receiver can also be a mobile reference receiver which can calculate a position error for at least one spatial direction by an environment sensor system of the user receiver. The user receiver can receive a position error calculated for at least one further spatial direction from at least one further mobile reference receiver.

A further subject of the invention is a computer program with programming code to carry out the method in accordance with the invention when the program is carried out on a computer.

A computer program product is also a subject of the invention having programming code stored on a computer legible data carrier (e.g., memory) to carry out the method in accordance with the invention when the program product is carried out on a computer.

In this connection, a computer is in particular understood as any desired data processing device with which the method can be carried out. A computer can have digital signal processors and/or microprocessors with which the method can be carried out fully or in part.

The object is furthermore satisfied by an apparatus having the features of claim 10 or claim 11.

BRIEF DESCRIPTION OF THE DRAWINGS

The invention will be described in the following by way of example with reference to the drawing, wherein.

DETAILED DESCRIPTION

Figure 1:
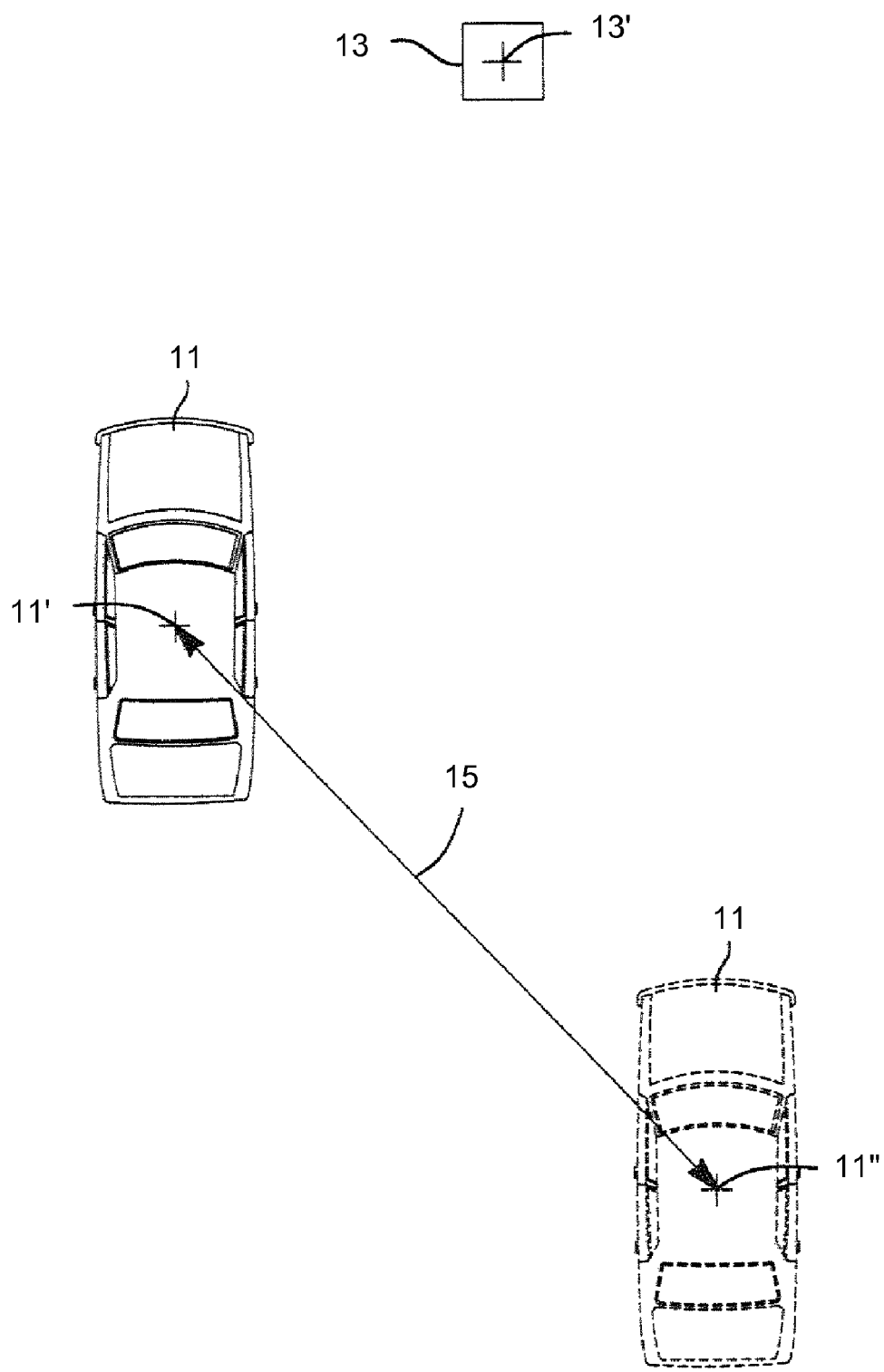
FIG. 1 is a view of a global position of a reference receiver determined by a navigation system, a corrected global position of a reference receiver, and a known global position of a landmark.

FIG. 1 shows a global position 11" of a vehicle 11 equipped with a GPS receiver. The global position is projected into a plane and is subject to error or not corrected. The global position 11" is determined by the satellite assisted navigation system GPS. A global position 13' of a stationary landmark, such as a global position of a post 13, located in an environment of the vehicle 11 is furthermore shown.

The vehicle 11 is equipped with an environment sensor (e.g., a laser scanner) for the detection, recognition and tracking of objects, such as stationary landmarks. The objects are also tracked using a digital map that includes the known global positions of the stationary landmarks.

In accordance with the invention, the environment sensor may scan a range of view with a rotating pulsed laser beam and detects the stationary landmark 13. An environment sensing system then compares data acquired by the detection of the stationary landmark 13 with data from entries in the digital map which correspond to stationary landmarks. Entries that are located in a spatially limited section of the environment of the global position 11" of the vehicle 11 are used in the comparison. The stationary landmark 13 can hereby be associated with an entry in the digital map corresponding to the stationary landmark 13. Thus, the known global position 13' can be determined. To increase security of the association, multiple stationary landmarks and their mutual arrangement are preferably detected and compared with corresponding entries in the digital map which have the same arrangement.

The corrected global position 11' of the vehicle 11 as shown in FIG. 1 can then be determined by a data processing apparatus. The corrected global position 11' can be determined based on the known global position 13' determined in this manner and based on the position of stationary landmark 13 relative to the vehicle 11 and determined by the environment sensing system.

A position error 15 of the global position 11" of the vehicle 11 determined by the navigation system can then be calculated. The global position 11" may be calculated based on the corrected global position 11' of the vehicle 11 and the global position 11" of the vehicle 11 determined by the navigation system.

Subsequently, the determined position error 15 can be transmitted from the vehicle 11 and analogously to a stationary reference receiver and/or to other vehicles equipped with a GPS receiver. The stationary reference receiver and/or other vehicles can correct their respective global positions, which are subject to error and determined by GPSs, based on the transmitted position error.

Figure 2:
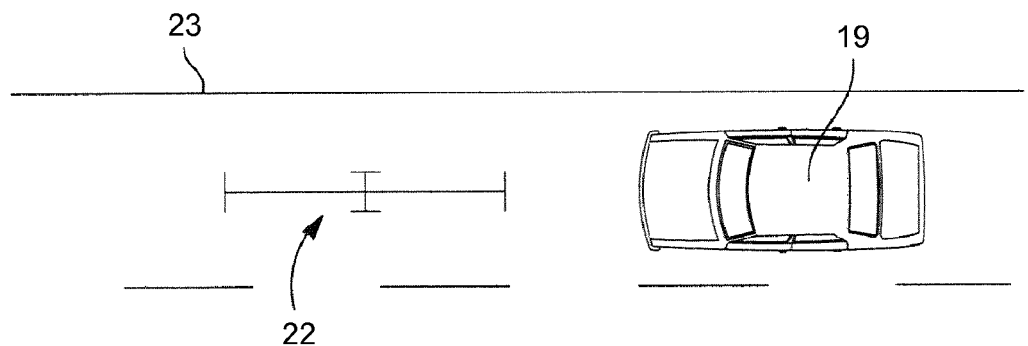
FIG. 2 is a view of two mobile reference receivers whose directions of movement extend substantially perpendicular to one another.
Figure 2:
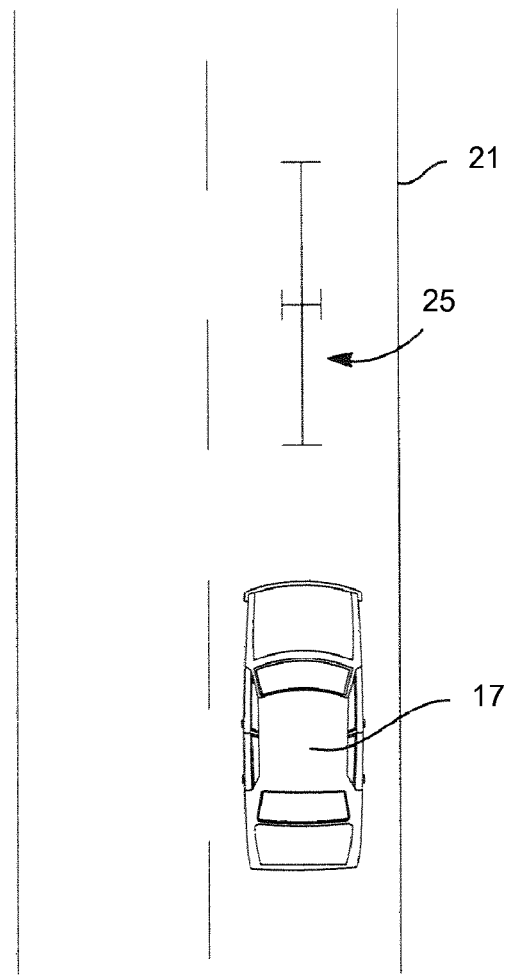

In FIG. 2, two vehicles 17 and 19 are shown that each are similar to the vehicle 11 of FIG. 1 and move substantially perpendicular to one another at least at a specific point in time or over a specific time duration. Instead of the stationary landmark 13 of FIG. 1, continuous lane marks 21 and 23 are detected in FIG. 2.

Error bars 25 and 27 are shown in the direction of travel and transversely to the direction of travel for accurately determining global positions. The position error 15 can only be calculated transversely to the direction of travel with lane markings since an accurate global position is not known and/or is not detectable in the direction of travel. Consequently, the accuracy of the position determination in the direction of travel cannot be increased. However, the accuracy can be increased transversely to the direction of travel and analogously to the situation in FIG. 1.

If both the position error calculated by vehicle 17 and the position error calculated by vehicle 19 are transmitted to a mere user receiver, i.e. a vehicle equipped with a GPS receiver not having its own environment sensor system, there is again a "complete" position error at the user receiver. The position error calculated by the vehicle 17 is only present with respect to one spatial direction. The position error calculated by the vehicle 19 is likewise only present with respect to one spatial direction, which extends substantially perpendicular to the first spatial direction.

The calculated "one-dimensional" position error of the global position of the vehicle 17 may be transmitted to the vehicle 19. The calculated "one-dimensional" position error of the global position of the vehicle 19 may be transmitted to the vehicle 17. This provides complete position errors for and determined by each of the vehicles 17, 19.

It is thus made possible by the use of mobile reference receivers, which are equipped with an environment sensor system, to increase accuracy of global positions of user receivers determined by a navigation system.

Figure 3:
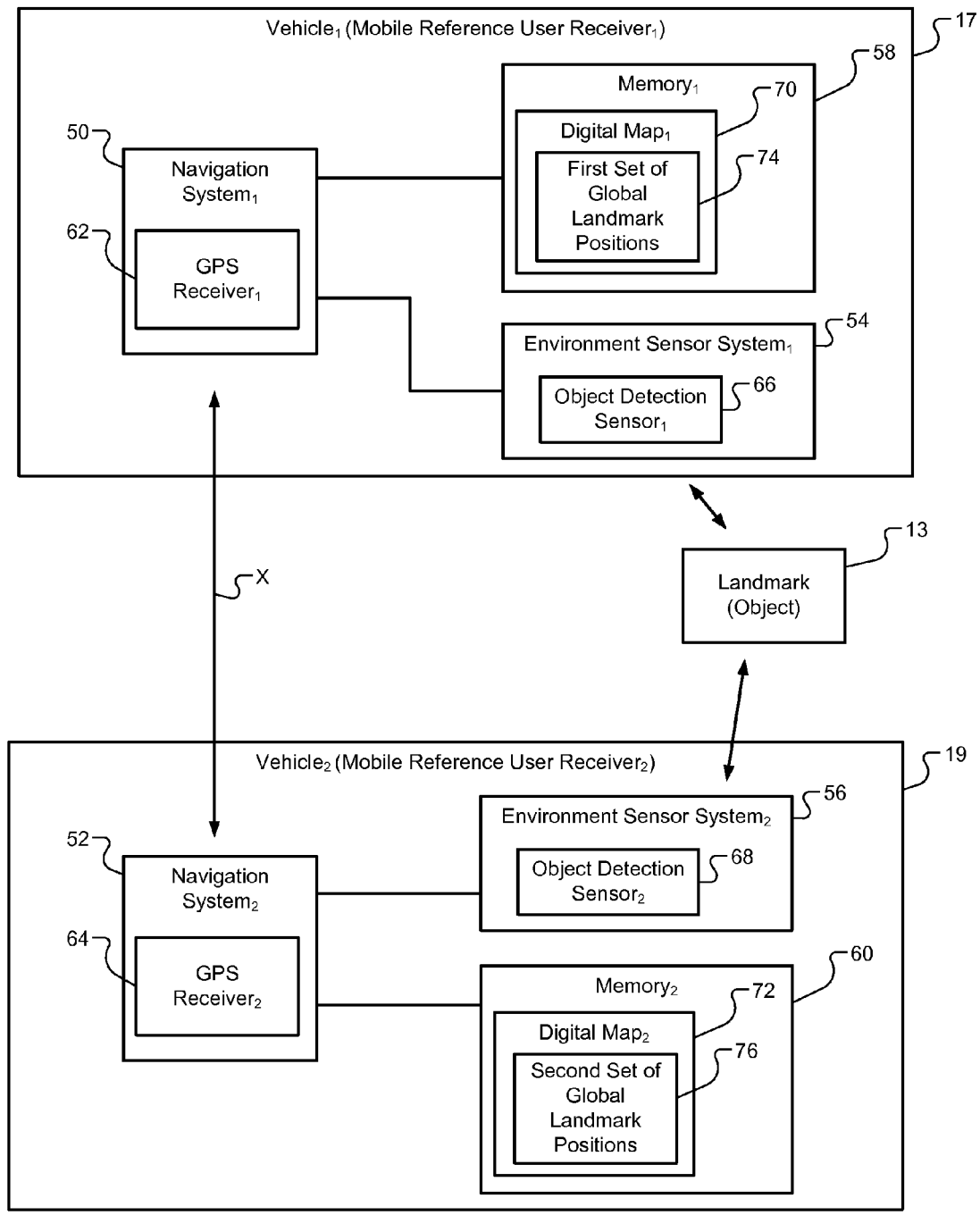
FIG. 3 is a functional block diagram of multiple mobile reference receivers operating in accordance with an embodiment of the present disclosure.

In FIG. 3, the vehicle 17 (first mobile reference receiver) and the vehicle 19 (second mobile reference receiver) are shown. The vehicles 17, 19 include respective navigation systems 50, 52, environment sensor systems 54, 56, and memories 58, 60. The navigation systems 50, 52 include respective GPSs 62, 64. The environment sensor systems 54, 56 include respective object detection sensors 66, 68. The memories 58, 60 include respective digital maps 70, 72 with stored global landmark positions 74, 76 (including position of the stationary landmark 13). The object detection sensors 66, 68 may detect the stationary landmark 13. The navigation systems 50, 52, the environment sensor systems 54, 56, the memories 58, 60, the GPSs 62, 64, and the object detection sensors 66, 68 operate as described above with respect to the embodiments of FIGS. 1 and 2.

REFERENCE NUMERAL LIST 11 vehicle
11' corrected global position
11" global position determined by means of a navigation system
13 stationary landmark (e.g., post)
13' known global position
15 position error
17 vehicle
19 vehicle
21 lane marking
23 lane marking
25 error bar
27 error bar
50 first navigation system
52 second navigation system
54 first environment sensor system
56 second environment sensor system
58 first memory
60 second memory
62 first GPS receiver
64 second GPS receiver
66 first object detection sensor
68 second object detection sensor
70 first digital map
72 second digital map
74 first set of global landmark positions
76 second set of global landmark positions

The invention claimed is:

1. A method for increasing accuracy of a global position of a user receiver determined by a navigation system of the user receiver, wherein:
   a global position of a mobile reference receiver is determined by a navigation system of the mobile reference receiver;
   at least one stationary landmark is detected by the at least one object detection sensor;
   a relative position of the at least one stationary landmark relative to the mobile reference receiver is determined by a sensing system based on data from at least one object detection sensor;
   a global position of said at least one stationary landmark in at least one spatial direction is determined based on a digital map;
   a position error of the global position of the mobile reference receiver is calculated for at least one spatial direction based on the global position of the at least one stationary landmark, the relative position, and the global position of the mobile reference receiver; and
   the position error is transmitted from the mobile reference receiver to the user receiver to increase the accuracy of the global position of the user receiver determined by the navigation system of the user receiver.

2. A method in accordance with claim 1, wherein:
   to determine the global position of the at least one stationary landmark, in a digital map, a section of an environment of the global position of the mobile reference receiver is determined in dependence on the global position of the mobile reference receiver; and
   the digital map includes an entry for the at least one stationary landmark and associated with the section.

3. A method in accordance with claim 1, wherein the at least one stationary landmark is detected, recognized and tracked in a plurality of sequential cycles by a laser scanner during movement of the mobile reference receiver.

4. A method in accordance with claim 1, wherein the global position of the mobile reference receiver and a corrected global position of the mobile reference receiver are compared with one another to calculate the position error.

5. A method in accordance with claim 4, wherein:
   a plurality of stationary landmarks are detected; and
   only a corrected global position of the mobile reference receiver is determined and is compared with the global position of the mobile reference receiver to calculate the position error.

6. A method of increasing accuracy of a global position of a user receiver determined by a navigation system, wherein:
   at least one position error determined in accordance with the method of claim 1 and is received from at least one mobile reference receiver; and
   a corrected global position of the user receiver for at least one spatial direction is determined with reference to the received at least one position error.

7. A method in accordance with claim 6, wherein:
   each of the at least one position error is calculated for at least one spatial direction and comprises a first position error and a second position error;
   a corrected global position of the user receiver is determined based on the first position error and the second position error; and
   the first position error is received from a different mobile reference receiver than the second position error.

8. A computer-readable medium having stored thereon a computer program executable by a computer, the computer program comprising instructions to carry out the method in accordance with claim 1.

9. A computer-readable medium having stored thereon a computer program executable by a computer, the computer program comprising instructions to carry out the method in accordance with claim 1.

10. A method comprising:
    determining a global position of a mobile reference receiver via a navigation system;
    detecting at least one stationary landmark based on data from at least one object detection sensor;
    determining a relative position of the at least one stationary landmark relative to the mobile reference receiver based on the global position and the data;
    accessing a digital map to retrieve a stored global position in at least one spatial direction of the at least one stationary landmark;
    calculating a first position error of the global position of the mobile reference receiver for at least one spatial direction based on the global position of the mobile reference receiver, the stored global position of the at least one stationary landmark, and the relative position; and
    transmitting the first position error from the mobile reference receiver to a user receiver.

11. The method of claim 10, wherein the mobile reference receiver is a first vehicle and the user receiver is a second vehicle.

12. The method of claim 10, further comprising determining a second position error based on:
    the first position error; and
    a global position of the user receiver determined by a navigation system of the user receiver.

13. The method of claim 10, further comprising determining a corrected global position of the mobile reference receiver based on:
    the stored global position of the at least one landmark; and
    the relative position,
    wherein the first position error is determined based on the corrected global position.

14. A mobile reference receiver comprising:
    a navigation system that determines a global position of a mobile reference receiver;
    at least one object detection sensor that generates data based on detection of at least one stationary landmark,
    wherein the navigation system:
        determines a relative position of the at least one stationary landmark relative to the mobile reference receiver based on the global position and the data;
        accesses a digital map to retrieve a stored global position in at least one spatial direction of the at least one stationary landmark;
        calculates a first position error of the global position of the mobile reference receiver for at least one spatial direction based on the global position of the mobile reference receiver, the stored global position of the at least one stationary landmark, and the relative position; and
        transmits the first position error from the mobile reference receiver to a user receiver.

15. A system comprising the mobile reference receiver of claim 14, further comprising a user receiver that determines a second position error based on:
    the first position error; and
    a global position of the user receiver determined by a navigation system of the user receiver.

* * * * *

UNITED STATES PATENT AND TRADEMARK OFFICE
CERTIFICATE OF CORRECTION

PATENT NO. : 7,746,271 B2  Page 1 of 1
APPLICATION NO. : 11/894262
DATED : August 17, 2007
INVENTOR(S) : Fürstenberg It is certified that error appears in the above-identified patent and that said Letters Patent is hereby corrected as shown below:

| | |
|---|---|
| Title Page, No. (54), Title | Title should be --METHODS OF DETERMINING AND CORRECTING GLOBAL POSITIONS OF OBJECTS--. |
| Column 1, Line 1-2 | Title should be --METHODS OF DETERMINING AND CORRECTING GLOBAL POSITIONS OF OBJECTS--. |
| Column 2, Line 3 | Delete "references" and insert --reference--. |
| Column 3, Line 29 | Delete "vehicles]" and insert --vehicles)--. |
| Column 4, Line 3 | Delete "received" and insert --receiver--. |

Signed and Sealed this

Twelfth Day of October, 2010

David J. Kappos
*Director of the United States Patent and Trademark Office*